(12) United States Patent
Willems et al.

(10) Patent No.: US 10,372,707 B2
(45) Date of Patent: *Aug. 6, 2019

(54) QUERY EXECUTION PIPELINING WITH PUMP OPERATORS

(71) Applicant: SAP SE, Walldorf (DE)

(72) Inventors: Paul Willems, Heidelberg (DE); Oliver Horn, Nussloch (DE)

(73) Assignee: SAP SE, Walldorf (DE)

( * ) Notice: Subject to any disclaimer, the term of this patent is extended or adjusted under 35 U.S.C. 154(b) by 43 days.

This patent is subject to a terminal disclaimer.

(21) Appl. No.: 15/363,545

(22) Filed: Nov. 29, 2016

(65) Prior Publication Data

US 2018/0150514 A1    May 31, 2018

(51) Int. Cl.
*G06F 17/30*    (2006.01)
*G06F 16/2453*    (2019.01)

(52) U.S. Cl.
CPC .. *G06F 16/24542* (2019.01); *G06F 16/24539* (2019.01); *G06F 16/24549* (2019.01)

(58) Field of Classification Search
CPC ......... G06F 17/30463; G06F 17/30457; G06F 17/30466; G06F 17/30474; G06F 17/30498; G06F 17/30504; G06F 17/30507; G06F 16/24542; G06F 16/24549; G06F 16/24539
See application file for complete search history.

(56) References Cited

U.S. PATENT DOCUMENTS

| | | | |
|---|---|---|---|
| 5,918,225 A | 6/1999 | White et al. | |
| 6,374,236 B1 | 4/2002 | Chen et al. | |
| 7,174,553 B1 | 2/2007 | Reed et al. | |
| 7,797,342 B2 | 9/2010 | Banks et al. | |
| 7,805,456 B2 | 9/2010 | Meijer et al. | |
| 8,977,600 B2 | 3/2015 | Crupi et al. | |
| 9,165,021 B2 | 10/2015 | Bhattacharjee et al. | |
| 9,298,768 B2 | 3/2016 | Varakin et al. | |
| 9,495,207 B1 | 11/2016 | Pjesivac-Grbovic et al. | |

(Continued)

OTHER PUBLICATIONS

Neumann, Thomas. "Efficiently compiling efficient query plans for modern hardware." Proceedings of the VLDB Endowment 4.9 (2011): 539-550.

(Continued)

*Primary Examiner* — Greta L Robinson (74) *Attorney, Agent, or Firm* — Mintz, Levin, Cohn, Ferris, Glovsky and Popeo, P.C.

(57) ABSTRACT

A system for query execution and planning with pipelining and pump operators is provided. In some implementations, the system performs operations comprising identifying a plurality of operators for executing a query, the plurality of operators including a first operator and a second operator, generating a pump operator when the first operator comprises a table scan operator, and/or generating a query plan for execution of the query, the query plan comprising the pump operator and the second operator. The operations can further include executing the pump operator to at least retrieve a portion of a database table, generate a first data portion based on the portion of the database table, and provide the first data portion for the second operator. Related systems, methods, and articles of manufacture are also described.

20 Claims, 7 Drawing Sheets

(56) References Cited

U.S. PATENT DOCUMENTS

| | | |
|---|---|---|
| 2001/0037322 A1 | 11/2001 | Lindsay et al. |
| 2004/0015511 A1 | 1/2004 | Seefeldt et al. |
| 2004/0078364 A1 | 4/2004 | Ripley et al. |
| 2004/0162822 A1 | 8/2004 | Papanyan et al. |
| 2005/0028134 A1 | 2/2005 | Zane et al. |
| 2005/0138000 A1 | 6/2005 | Roux et al. |
| 2007/0250470 A1 | 10/2007 | Duffy et al. |
| 2008/0033960 A1 | 2/2008 | Banks et al. |
| 2008/0098053 A1 | 4/2008 | Miao et al. |
| 2008/0281846 A1 | 11/2008 | Hoang et al. |
| 2009/0006429 A1 | 1/2009 | Champion et al. |
| 2009/0030874 A1* | 1/2009 | Das ................ G06F 17/30312 |
| 2009/0228434 A1 | 9/2009 | Krishnamurthy et al. |
| 2010/0262633 A1 | 10/2010 | Bhattacharjee et al. |
| 2010/0281017 A1 | 11/2010 | Hu et al. |
| 2012/0084315 A1 | 4/2012 | Schneider et al. |
| 2013/0054630 A1 | 2/2013 | Briggs et al. |
| 2013/0073573 A1 | 3/2013 | Huang et al. |
| 2013/0151502 A1 | 6/2013 | Yoon et al. |
| 2014/0089294 A1 | 3/2014 | Shankar et al. |
| 2014/0108861 A1* | 4/2014 | Abadi ................ G06F 9/5066 714/11 |
| 2014/0172914 A1 | 6/2014 | Elnikety et al. |
| 2014/0280030 A1 | 9/2014 | Freedman et al. |
| 2014/0280037 A1 | 9/2014 | Petride et al. |
| 2014/0351233 A1 | 11/2014 | Crupi et al. |
| 2015/0026154 A1 | 1/2015 | Jeong et al. |
| 2015/0178305 A1 | 6/2015 | Mueller et al. |
| 2015/0186461 A1 | 7/2015 | Nica |
| 2015/0193500 A1 | 7/2015 | Aute et al. |
| 2015/0261820 A1 | 9/2015 | Cheng et al. |
| 2015/0269228 A1* | 9/2015 | Fisher ............... G06F 17/30516 707/722 |
| 2017/0024433 A1* | 1/2017 | Neelakanthappa .......................... G06F 17/30442 |
| 2017/0228425 A1* | 8/2017 | Kandula ........... G06F 17/30463 |
| 2017/0262516 A1 | 9/2017 | Horowitz et al. |
| 2018/0150513 A1* | 5/2018 | Willems ............ G06F 17/30477 |

OTHER PUBLICATIONS

Herodotou, Herodotos, Nedyalko Borisov, and Shivnath Babu. "Query optimization techniques for partitioned tables." Proceedings of the 2011 ACM SIGMOD International Conference on Management of data. ACM, 2011 (12 pages).

* cited by examiner

QUERY EXECUTION PIPELINING WITH PUMP OPERATORS

TECHNICAL FIELD

The subject matter described herein relates to database management, and more particularly, query execution and planning with pipelining and pump operators.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some aspects, a method, computer program product and system are provided. In an implementation, a database execution engine is provided. The database execution engine can include (or otherwise utilize) a processor and/or memory, which can be configured to perform operations including identifying a plurality of operators for executing a query, the plurality of operators including a first operator and a second operator, generating a pump operator when the first operator comprises a table scan operator, and generating a query plan for execution of the query, the query plan comprising the pump operator and the second operator. The operations can further include executing the pump operator to at least retrieve a portion of a database table, generate a first data portion based on the portion of the database table, and provide the first data portion for the second operator.

In some variations, the table scan operator can comprise a plurality of predicate conditions for retrieving the portion of the database table and/or the pump operator can be executed to select (e.g., at runtime) an execution order of the plurality of predicate conditions. In some implementations, the pump operator can be generated to include the plurality of predicate conditions (e.g., as a first child node, where the predicate conditions are organized in a hierarchical tree format), and/or a push operator (e.g., as a second child node) for providing the first data portion for the second operator. In some variations, the operations can further include storing the first data portion in a predetermined memory location, and/or providing the stored first data portion for the second operator can comprise providing access to the predetermined memory location. In some implementations, the first data can be removed from the predetermined memory location after it is consumed by the second operator. In some aspects, the first data portion can comprise a data table having one or more rows and one or more columns.

In some variations, the first operator can be included at a start of a query execution pipeline and/or the second operator can be included in the query execution pipeline and after the first operator. In some variations, at least a portion of the plurality of operators can be split among a plurality of pipelines including a first pipeline and a second pipeline, the plurality of pipelines can be executed in a determined order to generate results responsive to the query, and/or executing the first pipeline can comprise iteratively generating one or more blocks of data based upon operations contained within the first pipeline and storing the one or more blocks as intermediate results for the second pipeline.

In some aspects, the pump operator can be generated based on a coded class definition, wherein the coded class definition comprises code for sequentially implementing pull operators and push operators (e.g., a first pull operator, followed by a first push operator, followed by a second pull operator, followed by a second push operator, etc.). In some implementations, the database execution engine can configured to provide query optimization of the query plan and select other execution engines to handle certain queries.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operators in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

Figure 1:
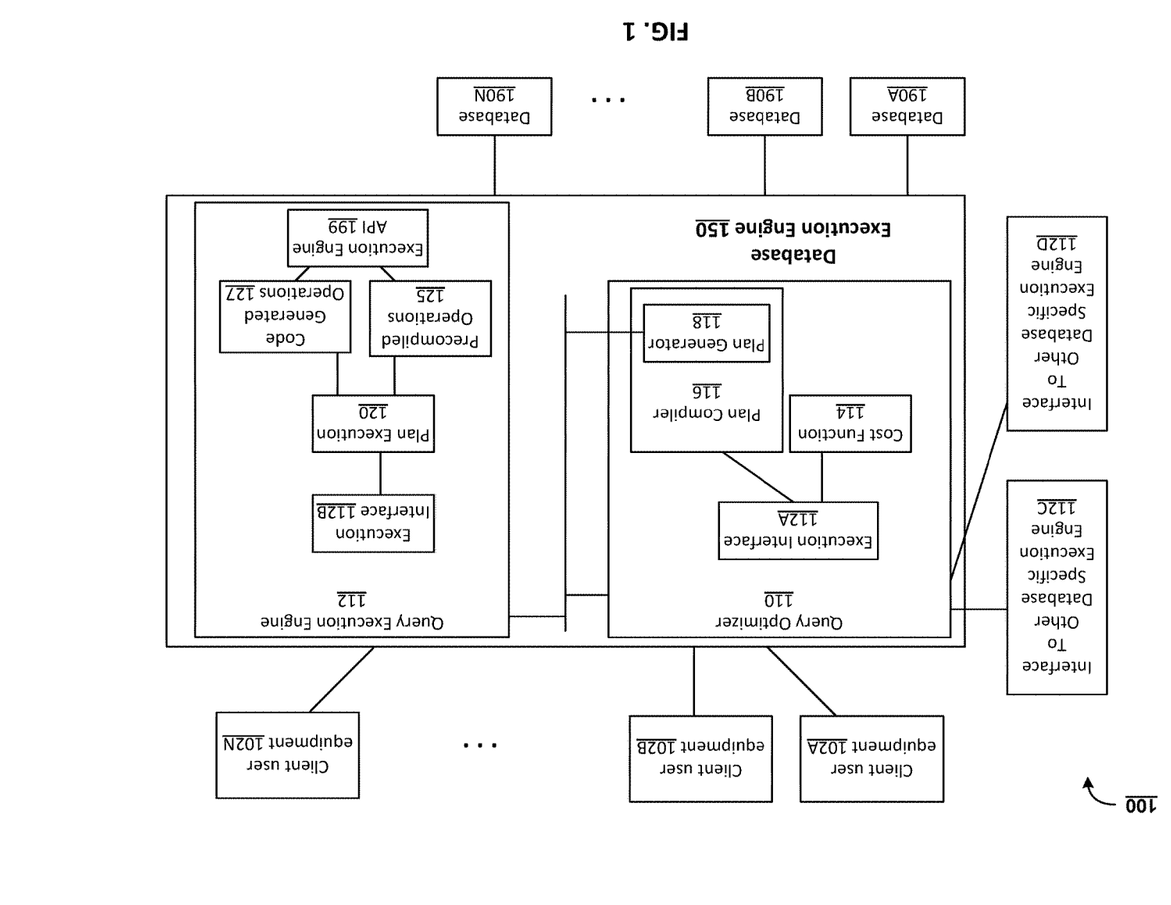
FIG. 1 depicts a block diagram of a system for query planning and/or execution, in accordance with some example implementations.

FIG. 1 depicts a block diagram of a system 100 for query planning and/or execution, in accordance with some example implementations. As illustrated, the system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns A and B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a value "X" and an indexvector scan with a valueid obtained from the dictionary look up, which results in a document ID list. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
| --- | --- |
| 1) TableScan (Filter X = 1) | dictionary lookup for value "X" indexvector scan with a valueid from the lookup, which results in a document ID (docid) list |
| 2) Materialization (Columns A, B) | For each docid, lookup value IDs (valueids) for columns A + B For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with precompiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example implementations, the database execution engine 150 may be provided with at least one table adapter. In some example implementations, the table adapter may generate an object, such as a table object, which can be stored in cache with other code, objects, and/or the like awaiting runtime execution of the query. In some example implementations, and the table object can be opened, during query execution, to provide access to a table stored in the persistence layer of a database.

Figure 2:
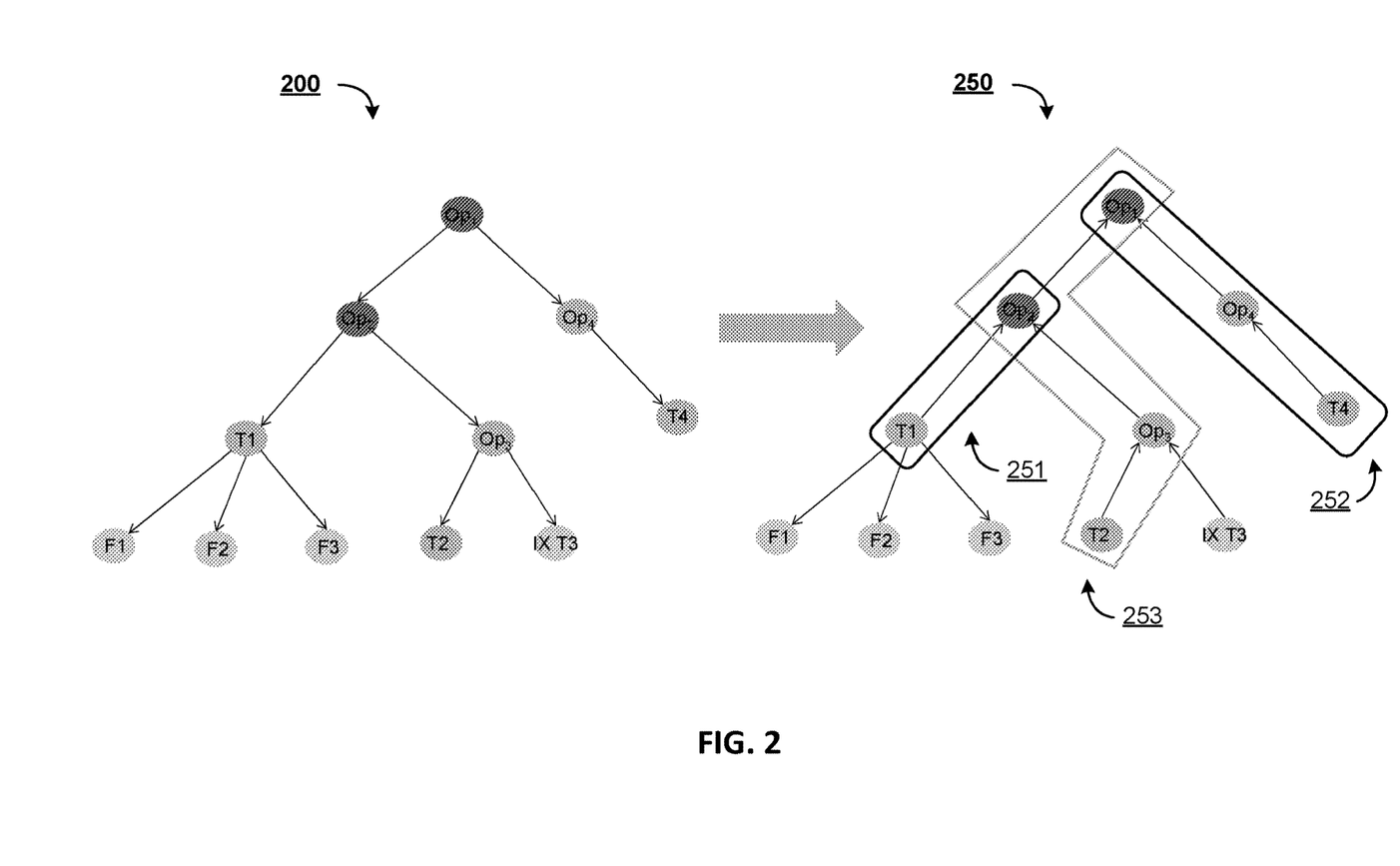
FIG. 2 depicts example query execution flow diagrams with and without pipelining, in accordance with some example implementations.

FIG. 2 depicts example query execution flow diagrams 200, 250 with and without pipelining, in accordance with some example implementations. As illustrated, the first query execution flow diagram 200 includes operators and table structures laid out in a hierarchical structure. The structure of the first query execution flow diagram 200 can be dependent upon the operators present within a query and/or tables utilized by the query. For example, as illustrated, operator $Op_1$ can be a function of operators $Op_2$ and $Op_4$ (e.g., a join, a hashjoin, or another function of two nodes). Operator $Op_2$ can be a function (e.g., a hashjoin) of table T1 and operator $Op_3$. Operator $Op_3$ can be a function of tables T2 and T3. For example, IX T3 can be an index lookup of table T3 and/or operator $Op_3$ can be a join of table T2 and the results of the index lookup on table T3. As illustrated, operator $Op_4$ can be a function of table T4 (e.g., a filter of table T4).

In some aspects, one or more of the tables T1-4 illustrated in the execution flow diagrams 200, 250 can instead be table scan operators which access information from a table. In some aspects, table scan operators can retrieve results from an underlying data table (e.g., a column store database/table) in a sequential manner and/or based on one or more functions (e.g., filters). For example, table T1 in the query execution flow diagrams 200, 250 can instead be a table scan operator on an underlying table, based on functions F1-3. The table scan of table T1 can be regarded as an evaluation of a plurality of predicates (e.g., such as a range of rows or columns required) for information that is retrieved from the table T1. In some aspects, at least a portion of the functions F1-3 can be predicated/implemented on an individual column basis. Although not illustrated, one or more of the remaining tables T2-4 can utilize or otherwise be table scan operators which provide data for responding to a query, based upon any number of functions (including zero). Although the functions F1-3 are illustrated as being part of the same execution level, the functions F1-3 used for a table scan can additionally or alternatively be implemented in a hierarchical manner.

In some implementations, the first query execution flow diagram 200 can be generated by translating a query into a (physical) algebraic expression and/or evaluating the query/expression. In some aspects, the first query execution flow diagram 200 can just be a visual representation of the query/expression, which may instead exist in the form of programming code. In some database systems, the first query execution flow diagram 200 can be executed through volcano style processing (e.g., via an iterator model), where each operator can produce a tuple stream from its input and/or allow for iterating over the tuple stream by repeatedly calling the next function of the operator. Accordingly, in some aspects, parent nodes in the first query execution flow diagram 200 can be regarded as "pulling" results from their child nodes. For example, in some aspects, the operator $Op_1$ may produce tuples by first repeatedly asking its left input (operator $Op_2$) for tuples, placing the received tuples in a hash table, repeatedly asking its right input (operator $Op_3$) for tuples, and/or probing the hash table for each tuple. The input sides could act in a similar manner, recursively asking for tuples from its child nodes and so on. However, although this approach can be simple to implement, it can consume more CPU than necessary (potentially thousands to even millions of times more than necessary), which can be due to poor cache locality (e.g., information which is necessary during execution is not present within and/or needs to be loaded into a cache) and/or complicated book-keeping (e.g., keeping track of intermediate results).

In order to reduce some of these inefficiencies, pipelining may be used. Pipelining can refer to the use of one or more operators which pass data to their parent operators without copying or otherwise materializing the data. As such, in some aspects, child nodes in the second query execution flow diagram 250 can be regarded as "pushing" results to their parent nodes. For example, instead of pulling tuples up, pipelined operators push tuples towards the consuming operators until the end of the pipeline. In order to decide which operators can be pipelined and/or the distribution of the operators among a plurality of pipelines, the query optimizer 110 (or some portion thereof), for example, can determine which, if any, of the operators in a query are "pipeline breakers."

In some aspects, a pipeline breaker can refer to an operator that takes an incoming tuple out of a CPU register for a given input side and/or materializes at least a portion of (e.g., all) incoming tuples from the input side before continuing processing. In some aspects, pipeline breakers and/or the contents of a given pipeline can be determined on multiple factors, such as whether an operator will spill data out of a cache and/or over into memory (e.g., external to cache memory). For example, in some implementations, operator $Op_1$ and operator $Op_2$ can be pipeline breakers, and/or can be set as the final operations in at least one of the pipeline 251-253. In some implementations, other factors can be used to determine where pipelines start, end, and/or what operators each pipeline contain.

Whatever procedure for generating pipelines is used, as illustrated, a first pipeline 250 can be formed to include table T1 and operator $Op_2$, a second pipeline 252 can be formed to include table T4, operator $Op_3$, and operator $Op_1$, and/or a third pipeline 253 can be formed to include table T2, operator $Op_4$, operator $Op_2$, and operator $Op_1$. When execution reaches the end of a pipeline 251-253, results can be materialized and/or placed within a hash table for the pipeline-breaking operator. For example, the results of the first pipeline 251 can be materialized and/or placed within a hash table for operator $Op_2$, then the results of the second pipeline 252 can be materialized and/or placed within a hash table for operator $Op_1$, and then the results of the third pipeline 253 can be materialized and/or placed within a hash table for operator $Op_1$.

In some aspects, pipelining can be regarded as organizing a query into a hierarchical plan of operators, identifying a plurality of paths within the hierarchical plan (e.g., where each path includes an endpoint operator that lies within another path and/or is shared between two paths), generating and pushing one or more chunks of data up a first path to accumulate results at the endpoint, and/or generating and pushing one or more chunks of data up a second path to generate output results based on the accumulated results from the first path. Additional paths can be present and/or additional generation of chunks can occur, depending upon the query (e.g., depending on how many paths are required to pipeline the operators). In some aspects, a chunk of data can be regarded as generated data which is responsive to an operator, but does not contain all of the data required for execution of the query or pipeline. However, in some implementations, depending upon the operator and/or portion of the database in question, a single "chunk" of data can contain all information responsive to a particular operator. For example, a scan of a small table may only require one chunk of data to be passed through a pipeline.

Non-pipelined query execution can be regarded as organizing a query into a hierarchical plan of operators, recursively calling a first child operator (and potentially its child operators) of the root node until all results of the first child operator are determined and/or stored, recursively calling a second child operator (and potentially its child operators) of the root node until all results of the second child operator are determined and/or stored, and/or processing the results of both child operators based on the root node after the results are determined and/or stored.

The use of pipelining can increase memory locality and/or reduce processing time/effort for database queries, as the number of memory accesses can be reduced. In some implementations, pipelining can take advantage or parallel processing systems and/or techniques. In some aspects, the first query execution flow diagram 200 and/or the second query execution flow diagram 250 can be regarded as at least a portion of a query execution plan. Additional processing and/or code generation can occur before or after the query execution flow diagrams 200, 250 are generated, which can help to optimize processing resources and/or reduce query execution time.

In some aspects, table scan operators can be difficult to push through a pipeline. For example, continually generating chunks of data small enough to push through a pipeline based upon a table scan can be cumbersome, and can cause an excessive number of table accesses. For example, requiring that a table scan operator be executed as part of pipeline can require that the order in which columns in a column-store database are scanned be set when a query plan is generated. If a column is scanned and one hundred rows match the scan, but when the next column is scanned, only two rows match the scan, then there would be ninety-eight additional evaluations at runtime than necessary. If the order of these columns is reversed, then runtime could be reduced. Thus, the flexibility in choosing an order of operations at runtime, for example, can be beneficial. In some aspects, the filter evaluation (of a table scan with filter predicates) can be pipeline breakers. Thus, pulling the results from the filter evaluation with the table scan operator working as a pump to push them to further query execution can be desirable.

Figure 3:
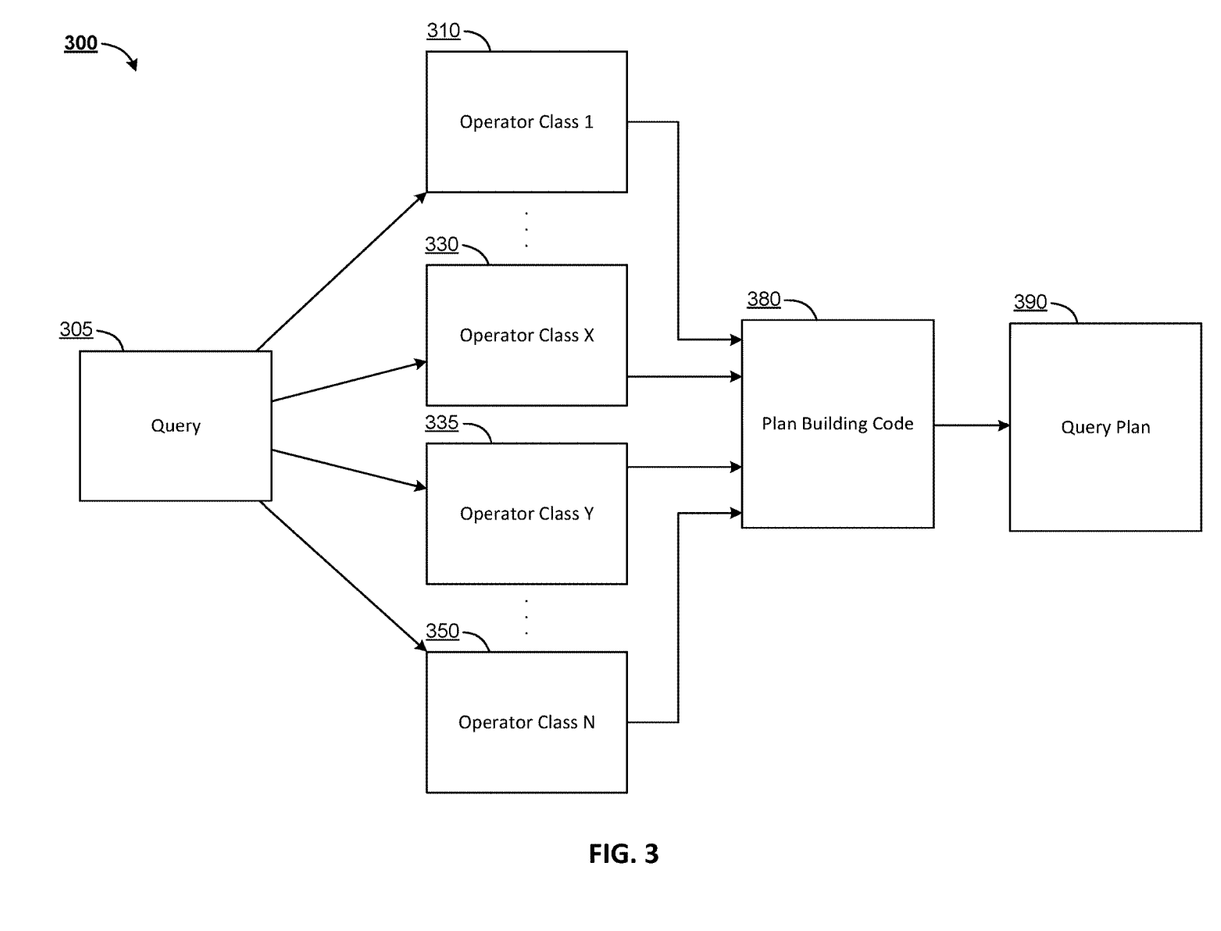
FIG. 3 depicts a block diagram of an example query planning procedure, in accordance with some example implementations.

FIG. 3 depicts a block diagram of an example query planning procedure 300, in accordance with some example implementations.

As illustrated, a query 305 can be received and/or processed to generate a query plan 390 for executing the query 305. One or more operator classes 310-350 can be generated and/or selected, based upon the query 305. At least a portion of the operator classes 310-350 can be used to build a query plan 390, based upon query plan building code 380. An operator class 310-350 can be regarded as a definition for one or more operators. An operator class 310-350 can be defined to include one or more attributes of a corresponding operator, such as an identifier for the operator, an indication of what type of operator the operator is, whether the operator is public, what inputs are required for the operator, what output(s) are produced, how the output(s) are produced, where the inputs are located, whether or not the inputs exist before execution time, and/or the like.

In some aspects, one or more of the operator classes 310-350 can define one or more of the precompiled operators 125 and/or code generated operators 127. Although the precompiled operators 125 and code generated operators 127 are illustrated within the query execution engine 112, they can be utilized during query plan generation and/or optimization. For example, the operator class 310 can define a precompiled operator 125, which is included in a query plan generated by the query optimizer 110 (or some portion thereof, such as the plan generator 118). In another example, the operator class 330 can define a code generated operator 127, which is included in a query plan generated by the query optimizer 110 (or some portion thereof). Other techniques for generating and/or utilizing operator classes 310-350 are possible.

The class definitions and the code for building the query plan can be defined based upon code, such as L programming language code of another type of code. Classes can define operators using different programming languages and/or include more or less information than what is described. For example, each class 310-350 can be defined to include any number of attributes (including zero), which can depend upon the query and/or operators processed/executed. Similarly, the code used for building a query plan can be in a different programming language and/or more or less code may be used for defining a query plan 390.

Each operator/class 310-350 utilized (e.g., accessed) by a query 305, can be analyzed to determine whether there may be any optimizations of the operators and/or the operators can be added to the query plan 390. Once the query plan 390 is generated, it may be provided to and/or executed by the query execution engine 112. Additionally or alternatively, executable code corresponding to the query plan 390 can be generated and/or provided to and/or executed by the query execution engine 112. In some implementations, one or more of the operator classes 310-350, at least a portion of the query plan building code 380, and/or at least a portion of the query plan 390 can be generated by processing the query 305.

Figure 4:
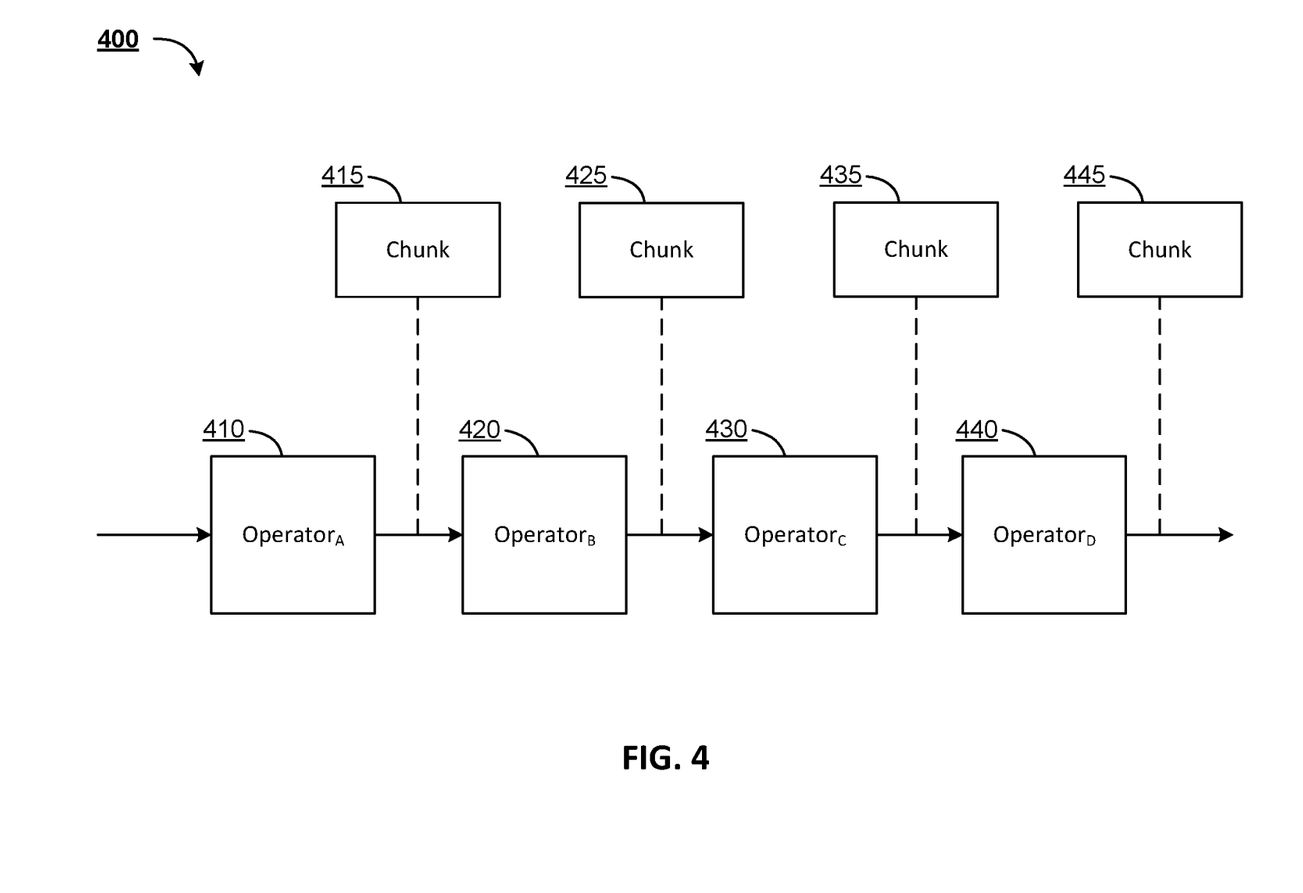
FIG. 4 depicts a block diagram of an example query plan, in accordance with some example implementations.

FIG. 4 depicts a block diagram of an example query plan 400, in accordance with some example implementations. As illustrated, the query plan 400 can include a plurality of operators 410-440, which, in some aspects, can be executed within one or more pipelines. The operators 410-440 can be similar to the operators of FIG. 1 and/or similar to the operators defined by the classes 310-350 of FIG. 3. For example, the operators 410-440 can comprise one or more operators, such as a scan, materialize, filter, group, group local, merge, group merge, join, hash join, table scan, and/or the like.

The query plan 400 (e.g., at least the illustrated portion) can begin at operator A 410, where a first data chunk 415 (or at least a portion thereof) is created. The first chunk 415 can be passed to operator B 420, which can generate a second chunk 425 (or at least a portion thereof), which may be based upon the first chunk 415. In some aspects, the second chunk 425 can contain the same information as the first chunk 415, but can additionally contain information generated/retrieved/provided by operator B 420. Operation can then proceed to operator C 430, where a third chunk 435 (or at least a portion thereof) is generated, similar to above. Operation can next proceed to operator D 440, where a fourth chunk 445 (or at least a portion thereof) is generated, similar to above. In some aspects, one or more of the operators A-D 410-440 can store the chunk 415-445 they generate for the next operator. In some implementations, one or more of the operators A-D 410-440 can operate on a chunk in place, generating a one or more columns of data for input into the chunk.

At the end of a pipeline including at least some portion of the operators A-D 410-440, the execution of the pipeline can return to the beginning (e.g., whatever the first operator is), where additional chunks can be generated and pushed through the pipeline until all information responsive to a query (or a portion of the query handled by the pipeline) is generated, stored, provided to another pipeline, and/or provided as output.

In some aspects, operator A 410 can be regarded as an operator which requires information from a table in a database. For example, in some aspects, operator A 410 can include a table scan operator, which is an operator that collects columns and/or rows from a database table based upon any number of conditions (including zero). Whatever operator A 410 includes, its requirement for information from a database can create additional issues when pipelining, which can, for example, slow down or halt query execution. Thus, instead of simply generating and passing chunks through a pipeline for generating query results, information can be pulled from a table first, at least where some operators are concerned.

Figure 5:
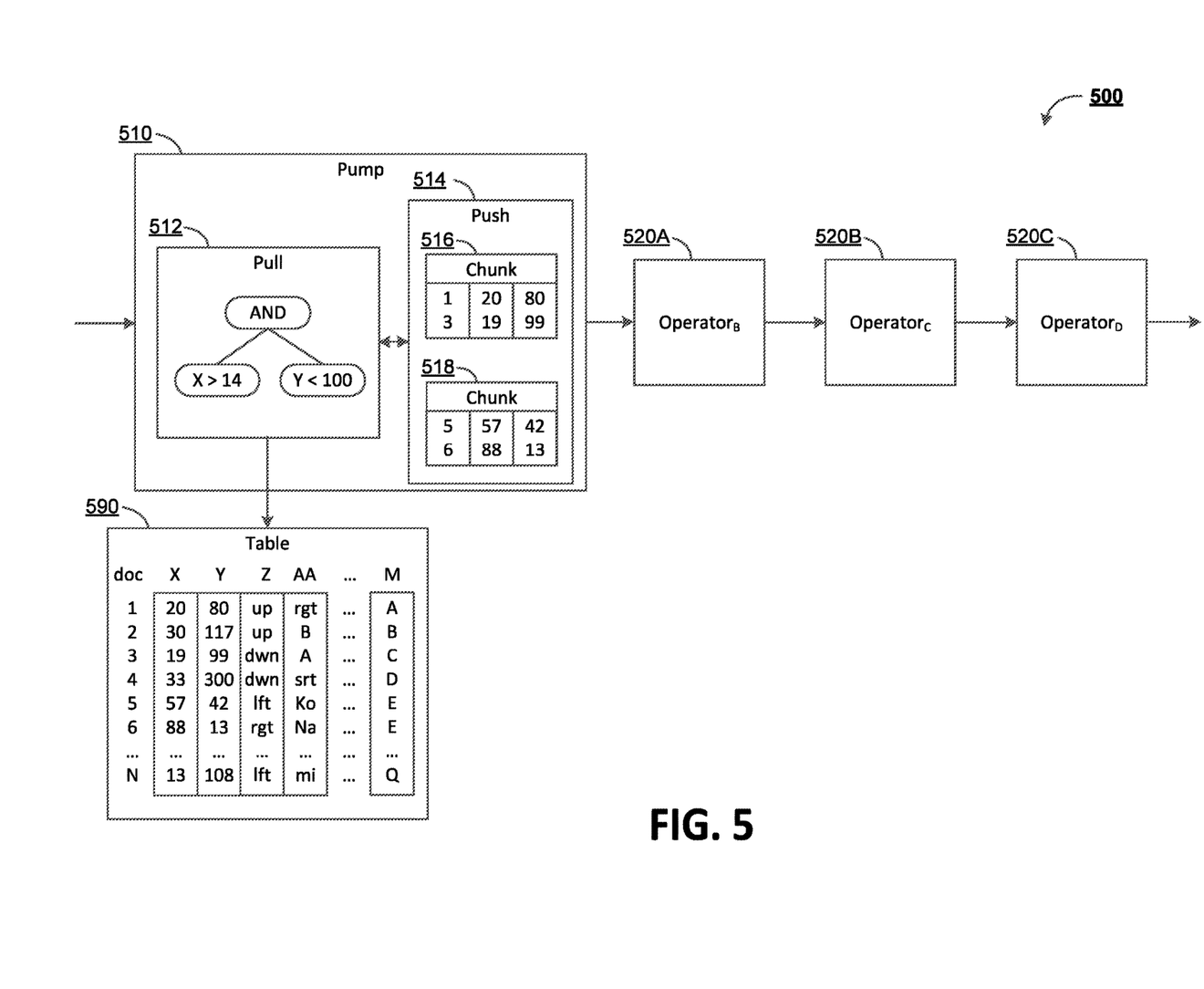
FIG. 5 depicts a block diagram of another example query plan, in accordance with some example implementations.

For example, FIG. 5 depicts another block diagram of an example query plan 500, in accordance with some example implementations. As illustrated, a pump operator 510 can be used to generate/provide information for subsequent operators, such as one of more of operators B-D 520A-520C. In various implementations, a data table 590 can be scanned in order to obtain/generate this information. As illustrated, the data table 590 can include M columns and/or N rows of data. In some aspects, N can refer to a document identifier associated with a particular entry, as opposed to an identifier for a row (e.g., plain indices to identify a physical row). The data can take any form (e.g., alphanumeric values) and/or the form of the data in the columns/rows can be dependent upon the type of table 590 (e.g., column store, row store, hash table, dictionary, and/or the like).

In some aspects, the pump operator 510 can be regarded as an operator which combines (at least the functionality of) a pull operator 512 and a push operator 514. As illustrated, the pump operator 510 can pull data from a database table 590 based upon one or more functions (also referred to herein as "predicates"). For example, rows/entries from the table can be retrieved based upon whether "(X>14) AND (Y<100)" is satisfied. In an example implementation, "(X>14)" can refer to whether a value stored in the column indexed 'X' is greater than a value of '14', and/or "(Y<100)" can refer to whether a value stored in the column indexed 'Y' is less than a value of '100'. Based upon these predicates, rows (or some portion thereof) which match both ("AND") conditions can be pulled/retrieved from the table 590 and/or loaded in memory (e.g., in a cache, heap, main memory, etc.). In some implementations, the pump operator 510 can be implemented as a root node with a pull operator 512 as one child and a push operator 514 as another child. In some aspects, the pull operator 512 as a child can mean that a hierarchical predicate tree (e.g., similar to the illustrated predicate tree structure) can be one of the children of the pump operator 510. If only one predicate exists (e.g., only the "X>14" predicate), then the predicate can be implemented as one of the child nodes of the pump operator 510 and/or the push operator 514 can be implemented as another child node.

In order to pull results from the table 590, the pump operator 510 or the pull operator 512 can determine an execution order for the predicates in the operator tree. In some aspects, the order of execution can be determined based upon how many entries from a column (e.g., in the case of a column store) would match the predicate. For example, as illustrated, only four of the first six rows/entries in the Y column will meet the predicate condition "Y<100", whereas all six of the first six rows/entries in the X column will meet the predicate condition "X>14". Theses value can be determined or estimated prior to runtime or as part of runtime. Although the estimation of how many row/entries match a predicate can take time/resources, it will generally take less time/resources than identifying which particular entries match the predicate (e.g., which document identifiers) and storing all entries matching the predicate in memory, only to find out that the entries do not satisfy other predicate requirements. In some implementations, dictionaries can be maintained for at least a portion of the columns, and the dictionaries can be searched to estimate how many entries within a given column will match a predicate.

Once the order operators is determined, the root node of a predicate tree can be called, which can call whatever operator will be executed first. In some implementations, calling the root node of the predicate tree can trigger an evaluation/determination of the order in which to evaluate the predicates/columns. In the illustrated example, "Y<100" can be called first, and it can return document identifiers 1, 3, 5, and 6. These document identifiers can be used as pre-filters for the next operator (because the root node is an "AND" operator), and therefore only four of the first six rows/entries will be scanned. Thus, unnecessary scans and/or or generation of results can be avoided. After both predicates are scanned, the root node can return the document identifiers matching the scan and/or the stored values of the columns. These identifiers and/or values can be used to form one or more chunk of data, which can be pushed by the push operator 514 to the next operator.

The pull operator 512 can be configured to scan the entire table 590 based upon the function. However, in some implementations, the pull operator 512 can scan smaller portions of the table 590 at a time (e.g., the first 10,000 rows can be scanned during the first execution of the pull operator 512). In some aspects, a maximum number of rows/entries can be scanned from the table 590 each time a column is evaluated based upon a predicate. In some aspects, a maximum number of row/entries may be used when generating chunks. For example, if the maximum number of entries scanned from the table 590 is set to three, then a first pass of the "Y<100" predicate could return document identifiers 1 and 3. In turn, the "X>14" predicate could be evaluated to determine whether document identifiers 1 or 3 are a match. Because they are a match, document identifiers 1 and 3 can be returned as results of the predicate tree (e.g., results of a table scan operator). These two document identifiers can be placed within a first chunk 516.

If a maximum number of entries per chunk is set to two, then the first chunk 516 can be pushed through the pipeline (e.g., operators B-D 520A-520C can utilize the first chunk 516). Operation can then return to operator 510, which can generate and push a second chunk 518 in a similar manner. Other maximums and/or minimums can be utilized. Setting a maximum number of rows/entries for a chunk can help to insure that the chunk can remain in a cache when passing through a pipeline. Although the chunks 516, 518 are illustrated as containing matching values for columns X and Y, in some implementations, the chunks 516, 518 may only contain document identifiers. Including the matching values for columns X and/or Y can depend upon whether any of the remaining operators in the pipeline will utilize the values.

In some aspects, dictionaries can be maintained, which can contain entries for each unique value within a column, along with corresponding document identifiers which contain the value. Thus, columns can be condensed in this manner and/or can be searched faster. In some aspects, a dictionary can be scanned instead of a scanning a column.

In some implementations, the results of the pull operator 512 can be stored in memory, such as a predetermined memory location allocated for the results. In some aspects, the pull operator 512 can continue to pull data from the data table 590 to generate chunks of data until all rows are scanned (or some other condition is met). Similarly, and the push operator 514 can continue to push chunks of data to other operators as long as the pull operator 512 generates chunks (or some other condition is met).

In some implementations, the push operator 514 can take the results of the pull operator 512 to generate the chunks of data itself. Thus, the pull operator 512 can retrieve a plurality of rows/entries from the table 590 based on one more conditions, and the push operator 514 can generate and provide chunks of data to the other operators 520A-520C, for example, until the retrieved results are exhausted. Thereafter, the pull operator 512 can retrieve additional data from the table 590, and the push operator 514 can continue to generate and/or push chunks of data, based upon the additional data, to other operators. In some aspects, it can be important that rows in a column store database are accessed sequentially.

In some implementations, a pump operator can be used to pull results from the end of one pipeline and push the results to/through the next pipeline that needs at least a portion of the results for operation.

Although the pull operator 512 is illustrated and described as using a scan including an "AND" operator on two columns, any number of columns can be scanned, a scan can be based upon an "OR" operator of any number of columns, filters upon individual columns can be used, and/or the like. In the event an AND predicate as well as an OR predicate are present within a predicate tree, the AND predicate can be evaluated before the OR. Additionally or alternatively, scans of the table 590 can be based upon contents of rows instead of columns.

The remaining operators B-D 520A-520C can utilize and/or generate chunks of data, which can be pushed through one or more pipelines in order to respond to a query or a portion thereof. Chunks of data can be removed from memory after they are used by an operator (e.g., after the last operator which needs the chunk).

Pulling portions of a database table based upon one or more filters (or other functions) and/or pushing generated results to subsequent operator can simplify processing of a query, reduce the amount of memory accesses required, decrease the processing resources required to execute a query, and/or decrease the processing time of a query. For example, in some implementations, one or more of the data chunks can be stored within a cache or memory (e.g., within a heap, main memory, etc.). If the chunks remain in the cache/memory, then a subsequent operator (e.g., an operator other than the operator which added the chunk to the cache/memory) which accesses the cache/memory does not need to access the state from a database or recalculate the information contained in the state itself. Doing so can increase memory locality. In some aspects, the memory allocated for each chunk (or multiple chunks) can be contiguous, which can help to increase memory locality and/or decrease the occurrence of cache misses. Additionally, controlling when/what data is pulled from a database, where/how the data is stored, and/or how the information is provided to/for other operators can help to control when/how many memory/database accesses are made during query execution.

Although specific operators are illustrated and described, such as scan, materialize, filter, group, group local, merge, group merge, join, hash join, table scan, etc., other operators are possible. Similarly, although specific data structures of states are illustrated and described, such as tables, column stores, row stores, hash tables, dictionaries, etc., other data structures are possible, such as maps, numbers, vectors, pointers, strings, handles, fragment handles, some combination thereof, and/or the like. Although several systems, methods, operators, procedures, etc. are described with respect to pipelining, one or more of the aspects described herein can be implemented outside of a pipeline.

Figure 6:
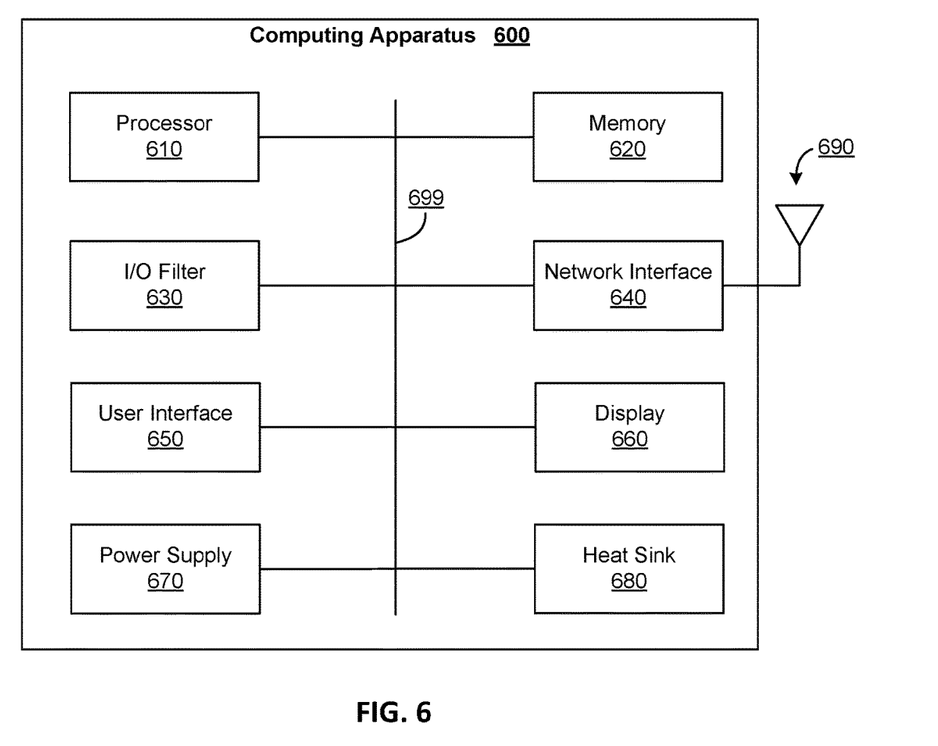
FIG. 6 depicts a block diagram of an example computing apparatus, in accordance with some example implementations.

FIG. 6 illustrates an example computing apparatus 600 which may be used to implement one or more of the described devices and/or components, in accordance with some example implementations. Similarly, the computing apparatus 600 may perform one or more of the processes described herein. In some aspects, at least a portion of the computing apparatus 600 can form at least a portion of the client user equipment 102A-N, the interfaces to other execution engines 112C-D, the database execution engine 150, and/or the databases 190A-N.

As illustrated, computing apparatus 600 may include one or more processors such as processor 610 to execute instructions that may implement operations consistent with those described herein. Apparatus 600 may include memory 620 to store executable instructions and/or information. Memory 620 may include solid-state memory, solid-state disk drives, magnetic disk drives, or any other information storage device. Apparatus 600 may include one or more network interfaces, such as network interface 640, which can be configured to communicate over wired networks and/or wireless networks. Wireless networks may include WiFi, WiMax, Bluetooth, and cellular networks (2G/3G/4G/5G), and/or any other wireless network. In order to effectuate wireless communications, the network interface 640, for example, may utilize one or more antennas, such as antenna 690.

Apparatus 600 may include one or more user interface, such as user interface 650. The user interface 650 can include hardware or software interfaces, such as a keyboard, mouse, or other interface, some of which may include a touchscreen integrated with a display 660. In various implementations, the user interface 650 can include one or more peripheral devices and/or the user interface 650 may be configured to communicate with these peripheral devices.

The apparatus 600 may also comprise and input and output filter 630, which can filter information received from and/or transmitted to a user interface 650, a network interface 640, and/or the like. The apparatus 600 may be powered through the use of one or more power sources, such as power source 670. One or more of the components of the apparatus 600 may be cooled off through the use of one or more heat sinks, such as heat sink 680. As illustrated, one or more of the components of the apparatus 600 may communicate and/or receive power through a system bus 699.

In some implementations, the computing apparatus 600 can be used to implement at least a portion of a database management system. In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

For example, the computing apparatus 600 can provide one or more features of a high-level programming software system or other software that includes database management features. The computing apparatus 600 can also aggregate or otherwise provide a gateway via which users can access functionality provided by one or more external software components. One or more client machines can access the computing apparatus 600, either via a direct connection, a local terminal, or over a network (e.g. a local area network, a wide area network, a wireless network, the Internet, or the like).

The computing apparatus 600 can be configured to access a database that includes at least one table, which can in turn include at least one column. The database table can store any kind of data, potentially including but not limited to definitions of scenarios, processes, and one or more configurations as well as transactional data, metadata, master data, etc. relating to instances or definitions of the scenarios, processes, and one or more configurations, and/or concrete instances of structured data, such as objects that are relevant to a specific instance of a scenario or a process, and the like. The database can be external to the computing apparatus 600 or may be part of the computing apparatus 600 (e.g., at least partially stored in the memory 620). In some aspects, the memory 620 may be utilized to store at least a portion of a database and/or function as an in-memory database.

For example, a processor 610, a network interface 640, and/or a user interface 650 may be configured to receive and/or load a database table or other comparable data set, into the memory 620 (e.g., in response to receipt of a query instantiated by a user or computer system through one or more client machines, external software components, core software platforms, and/or the like).

Figure 7:
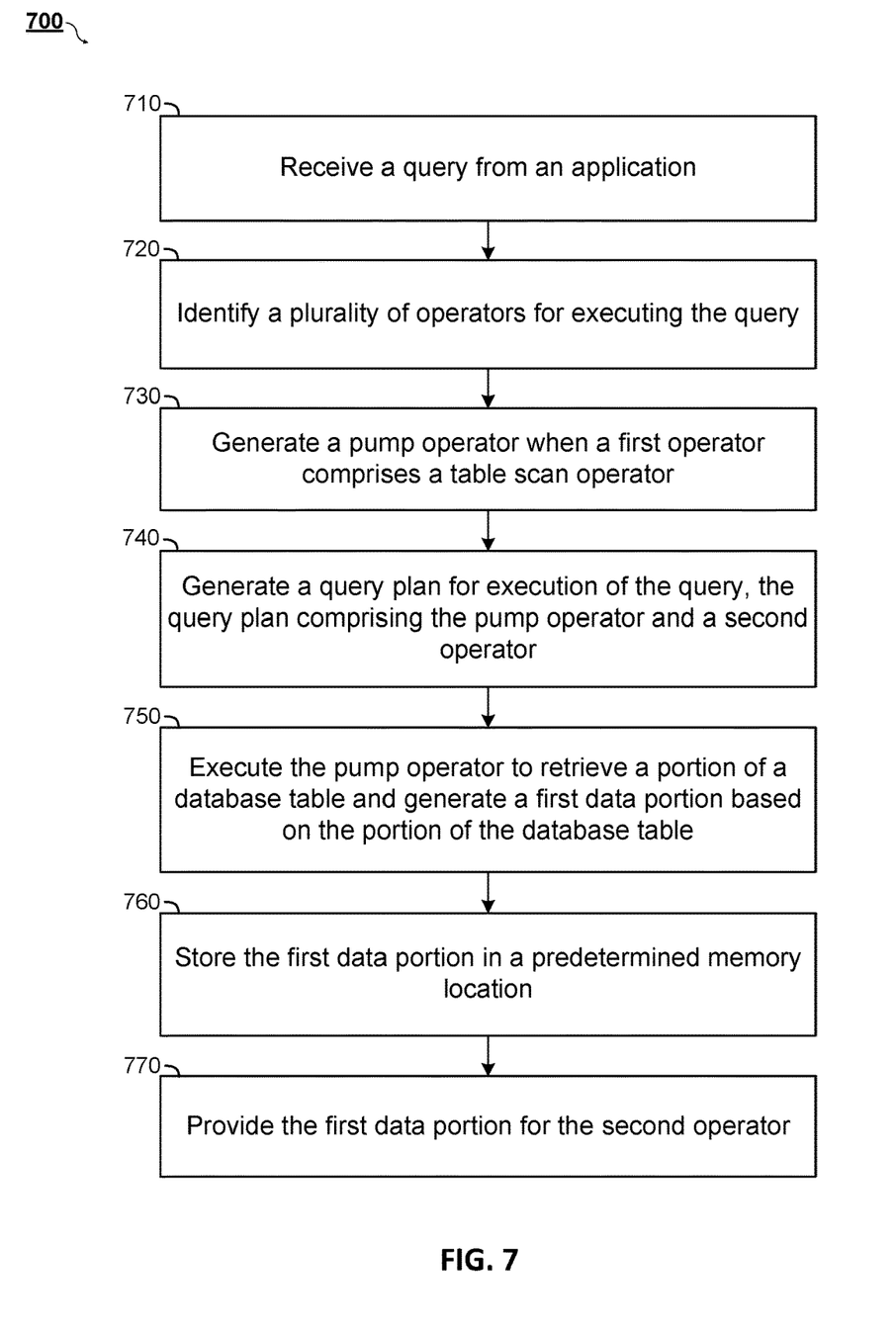
FIG. 7 depicts an example of a method for database query planning and/or execution, in accordance with some example implementations.

FIG. 7 depicts an example of a method 700 for database query planning and/or execution, in accordance with some example implementations. At least a portion of the method 700 can be performed by a computing apparatus 600, which can form at least a portion of a database execution engine 150.

As illustrated, the method 700 can begin at operational block 710, where the computing apparatus 600, for example, can receive a query from an application (e.g., separate from the database execution engine).

The method 700 can proceed to operational block 720, where the computing apparatus 600, for example, can identify a plurality of operators for executing the query. In some aspects, the plurality of operations can comprise a first operator and a second operator.

The method 700 can proceed to operational block 730, where the computing apparatus 600, for example, can generate a pump operator when a first operator comprises a table scan operator. In some implementations, the pump operator can be generated based on a coded class definition including code for sequentially implementing at least pull and push operators (e.g., pull, push, pull, push).

The method 700 can proceed to operational block 740, where the computing apparatus 600, for example, can generate a query plan for execution of the query, the query plan comprising the pump operator and a second operator. In some implementations, the first operator can be included at a start of a query execution pipeline and/or the second operator can be included in the query execution pipeline.

The method 700 can proceed to operational block 750, where the computing apparatus 600, for example, can execute the pump operator to at least retrieve a portion of a database table and generate a first data portion based on the portion of the database table. In some aspects, the first data portion can include a data table having one or more rows and one or more columns. In some implementations, the table scan operator can include a plurality of predicate conditions for retrieving the portion of the database table. In related implementations, the pump operator can be executed to select an execution order of the plurality of predicate conditions at runtime. In some implementations, the pump operator can be generated to include, as a first child node, the plurality of predicate conditions in a hierarchical tree, and/or to include, as a second child node, a push operator (e.g., for providing the first data portion for the second operator).

The method 700 can proceed to operational block 760, where the computing apparatus 600, for example, can store the first data portion in a predetermined memory location.

The method 700 can proceed to operational block 770, where the computing apparatus 600, for example, can provide the first data portion for the second operator. In some aspects, providing the stored first data portion for the second operator can comprise providing access to the predetermined memory location. In some aspects, the first data portion can be removed from the predetermined memory location after it is consumed by the second operator.

In some implementations, at least a portion of the plurality of operators can be split among a plurality of pipelines including a first pipeline and a second pipeline, and/or the plurality of pipelines can be executed in a determined order to generate results responsive to the query. Executing the first pipeline can comprise iteratively generating one or more blocks of data based upon operations contained within the first pipeline and/or storing the one or more blocks as intermediate results for the second pipeline. In some aspects, the database execution engine can be configured to provide query optimization of the query plan and select other execution engines to handle certain queries.

In this way, the database execution engine 150 can perform complex operations which share information necessary for and/or produced by execution of a query, while also pipelining execution.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, the order of the operations may be altered, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   identifying, by a database execution engine, a plurality of operators for executing a query, the plurality of operators including a first operator and a second operator;
   generating, by the database execution engine, a pump operator when the first operator comprises a table scan operator;
   generating, by the database execution engine, a query plan for execution of the query, the query plan comprising the pump operator and the second operator; and
   executing, by the database execution engine, the pump operator to at least retrieve a portion of a database table, generate a first data portion based on the portion of the database table, and provide the first data portion for the second operator.

2. The system of claim 1, wherein the table scan operator comprises a plurality of predicate conditions for retrieving the portion of the database table, and wherein the pump operator is executed to additionally select, at runtime, an execution order of the plurality of predicate conditions.

3. The system of claim 2, wherein the pump operator is generated to include, as a first child node, the plurality of predicate conditions in a hierarchical tree, and wherein the pump operator is generated to include, as a second child node, a push operator for providing the first data portion for the second operator.

4. The system of claim 1, wherein the first operator is included at a start of a query execution pipeline and the second operator is included in the query execution pipeline and after the first operator.

5. The system of claim 1, wherein at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

6. The system of claim 1, wherein the pump operator is generated based on a coded class definition, and wherein the coded class definition comprises code for implementing at least: a first pull operation, a first push operation, a second pull operation, and a second push operation.

7. The system of claim 1, wherein the operations further comprise:
   storing the first data portion in a predetermined memory location, wherein providing the stored first data portion for the second operator comprises providing access to the predetermined memory location.

8. The system of claim 7, wherein the first data is removed from the predetermined memory location after it is consumed by the second operator.

9. The system of claim 1, wherein the first data portion comprises a data table having one or more rows and one or more columns.

10. The system of claim 1, wherein the database execution engine is configured to provide query optimization of the query plan and select other execution engines to handle certain queries.

11. A method comprising:
   identifying, by a database execution engine, a plurality of operators for executing a query, the plurality of operators including a first operator and a second operator;

generating, by the database execution engine, a pump operator when the first operator comprises a table scan operator;

generating, by the database execution engine, a query plan for execution of the query, the query plan comprising the pump operator and the second operator; and executing, by the database execution engine, the pump operator to at least retrieve a portion of a database table, generate a first data portion based on the portion of the database table, and provide the first data portion for the second operator.

12. The method of claim 11, wherein the table scan operator comprises a plurality of predicate conditions for retrieving the portion of the database table, and wherein the pump operator is executed to additionally select, at runtime, an execution order of the plurality of predicate conditions.

13. The method of claim 11, wherein the first operator is included at a start of a query execution pipeline and the second operator is included in the query execution pipeline and after the first operator.

14. The method of claim 11, wherein at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

15. The method of claim 11, wherein the pump operator is generated based on a coded class definition, wherein the coded class definition comprises code for sequentially implementing at least: a first pull operator, a first push operator, a second pull operator, and a second push operator.

16. A non-transitory computer program product storing instructions which, when executed by at least one data processor, causes operations comprising:

identifying, by a database execution engine, a plurality of operators for executing a query, the plurality of operators including a first operator and a second operator;

generating, by the database execution engine, a pump operator when the first operator comprises a table scan operator;

generating, by the database execution engine, a query plan for execution of the query, the query plan comprising the pump operator and the second operator; and executing, by the database execution engine, the pump operator to at least retrieve a portion of a database table, generate a first data portion based on the portion of the database table, and provide the first data portion for the second operator.

17. The non-transitory computer program product of claim 16, wherein the table scan operator comprises a plurality of predicate conditions for retrieving the portion of the database table, and wherein the pump operator is executed to additionally select, at runtime, an execution order of the plurality of predicate conditions.

18. The non-transitory computer program product of claim 16, wherein the first operator is included at a start of a query execution pipeline and the second operator is included in the query execution pipeline and after the first operator.

19. The non-transitory computer program product of claim 16, wherein at least a portion of the plurality of operators are split among a plurality of pipelines including a first pipeline and a second pipeline, wherein the plurality of pipelines are executed in a determined order to generate results responsive to the query, and wherein executing the first pipeline comprises iteratively generating one or more blocks of data based upon operations contained within the first pipeline and storing the one or more blocks as intermediate results for the second pipeline.

20. The non-transitory computer program product of claim 16, wherein the pump operator is generated based on a coded class definition, wherein the coded class definition comprises code for sequentially implementing at least: a first pull operator, a first push operator, a second pull operator, and a second push operator.

* * * * *